US008044344B2

(12) United States Patent
Naya et al.

(10) Patent No.: US 8,044,344 B2

(45) Date of Patent: Oct. 25, 2011

(54) MASS SPECTROSCOPE

(75) Inventors: Masayuki Naya, Ashigara-kami-gun (JP); Yuichi Tomaru, Ashigara-kami-gun (JP); Naoki Murakami, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 185 days.

(21) Appl. No.: 12/409,146

(22) Filed: Mar. 23, 2009

(65) Prior Publication Data

US 2009/0236512 A1 Sep. 24, 2009

(30) Foreign Application Priority Data

Mar. 24, 2008 (JP) ................................ 2008-075367

(51) Int. Cl.
*B01D 59/44* (2006.01)

(52) U.S. Cl. ......... 250/281; 250/282; 250/287; 250/288

(58) Field of Classification Search .................. 250/281, 250/282, 287, 288
See application file for complete search history.

(56) References Cited

U.S. PATENT DOCUMENTS

| | | | | |
|---|---|---|---|---|
| 5,955,729 | A * | 9/1999 | Nelson et al. | 250/282 |
| 6,460,998 | B1 * | 10/2002 | Watanabe | 353/20 |
| 7,408,152 | B2 * | 8/2008 | Holle et al. | 250/288 |
| 2006/0001884 | A1 * | 1/2006 | Tani et al. | 356/445 |
| 2006/0034729 | A1 * | 2/2006 | Poponin | 422/82.05 |
| 2006/0214101 | A1 * | 9/2006 | Takahashi et al. | 250/288 |
| 2007/0158549 | A1 * | 7/2007 | Naya et al. | 250/288 |
| 2009/0087193 | A1 * | 4/2009 | Eiselt et al. | 398/152 |
| 2009/0213453 | A1 * | 8/2009 | Yao | 359/301 |
| 2010/0207021 | A1 * | 8/2010 | Vertes et al. | 250/282 |

FOREIGN PATENT DOCUMENTS

| | | | |
|---|---|---|---|
| EP | 1 801 567 | A1 | 6/2007 |
| JP | 2007-171003 | A | 7/2007 |

OTHER PUBLICATIONS

EP Communication, dated Aug. 6, 2010, issued in corresponding EP Application No. 09003984.3, 7 pages.

* cited by examiner

*Primary Examiner* — Michael Maskell

(74) *Attorney, Agent, or Firm* — Sughrue Mion, PLLC

(57) ABSTRACT

A mass spectroscope includes a mass analysis device having a surface provided with metallic members capable of exciting plasmons when irradiated by laser light, the mass analysis device allowing an analyte to be attached to the surface, a light radiation unit for irradiating the surface of the mass analysis device with laser light to ionize the analyte attached to the surface and desorb the analyte from the surface, and a detection unit for detecting a mass of the analyte ionized and desorbed from the surface of the mass analysis device from a time of flight of the analyte. The light radiation unit includes a polarization adjusting mechanism for adjusting a polarization direction of the laser light.

6 Claims, 6 Drawing Sheets

MASS SPECTROSCOPE

The entire contents of documents cited in this specification are incorporated herein by reference.

BACKGROUND

The present invention relates to a mass spectroscope for detecting an analyte.

Among mass spectroscopy methods used for the identification of an analyte or other like purposes is a mass spectrometry whereby an analyte is irradiated by laser light to ionize and desorb the analyte, and the desorbed analyte is detected according to mass.

Among the methods of ionizing an analyte used in the mass spectroscopy are, for example, the MALDI (matrix-assisted laser desorption/ionization) method and the SALDI (surface-assisted laser desorption/ionization) method, as described in "Analytical Chemistry," Volume 77, Number 16, pp. 5364 to 5369.

The MALDI method is a method whereby a sample prepared by mixing an analyte into a matrix (e.g., sinapic acid or glycerin) is irradiated by light to allow the matrix to absorb the energy of the light with which the sample was irradiated, the analyte is vaporized together with the matrix, and the proton transfer is allowed to take place between the matrix and the analyte, achieving ionization of the analyte.

The SALDI method is a method whereby no matrix is used and the surface of a substrate upon which a sample is placed is instead given functions similar to those of a matrix so that the analyte is ionized directly upon the surface of the substrate. Analytical Chemistry referred to above describes a DIOS method wherein the substrate is a porous silicon plate having pores each measuring hundreds of nanometers.

JP 2007-171003 A describes a mass spectroscope using a mass analysis substrate wherein at least part of the surface upon which an analyte is placed (i.e., detection surface) is adapted to be a rough metallic surface capable of exciting localized plasmons upon irradiation with laser light. That mass spectroscope detects the mass of an analyte by irradiating the detection surface of the mass analysis substrate with laser light to desorb the analyte from the detection surface and trap the analyte desorbed from the detection surface.

Mass spectroscopes are required to be capable of a high-accuracy mass detection of an analyte and an efficient ionization thereof with less energy.

SUMMARY OF THE INVENTION

Thus, an object of the present invention is to provide a mass spectroscope having a simple configuration and capable of a high-accuracy and efficient mass analysis of an analyte.

The inventors of the present invention made intensive studies in order to solve the above problems and found that in a mass spectroscope wherein the detection surface is irradiated by laser light to excite plasmons on the detection surface and an analyte is desorbed from the detection surface by the energy generated by the plasmons, the polarization of the laser light changes the intensity of the plasmons themselves and the conversion efficiency with which the laser light is converted into energy.

They also found that when the excitation light directed to hit the detection surface is polarized in an optimum direction, energy can be efficiently generated on the detection surface so that even a laser light having a low intensity can desorb the analyte from the detection surface.

A mass spectroscope according to the invention comprises: a mass analysis device including a surface having metallic members capable of exciting plasmons when irradiated by laser light, the mass analysis device allowing an analyte to be attached to the surface; light radiating means for irradiating the surface of the mass analysis device with laser light to ionize the analyte attached to the surface and desorb the analyte from the surface, the light radiating means including a polarization adjusting mechanism for adjusting a polarization direction of the laser light; and detecting means for detecting a mass of the analyte ionized and desorbed from the surface of the mass analysis device from a time of flight of the analyte.

BRIEF DESCRIPTION OF THE DRAWINGS

The invention will be better understood by reference to the following description taken in conjunction with the accompanying drawings in which.

DESCRIPTION OF THE PREFERRED EMBODIMENTS

Now, the mass spectroscope according to the invention will be described in detail based upon embodiments illustrated in the attached drawings.

Figure 1:
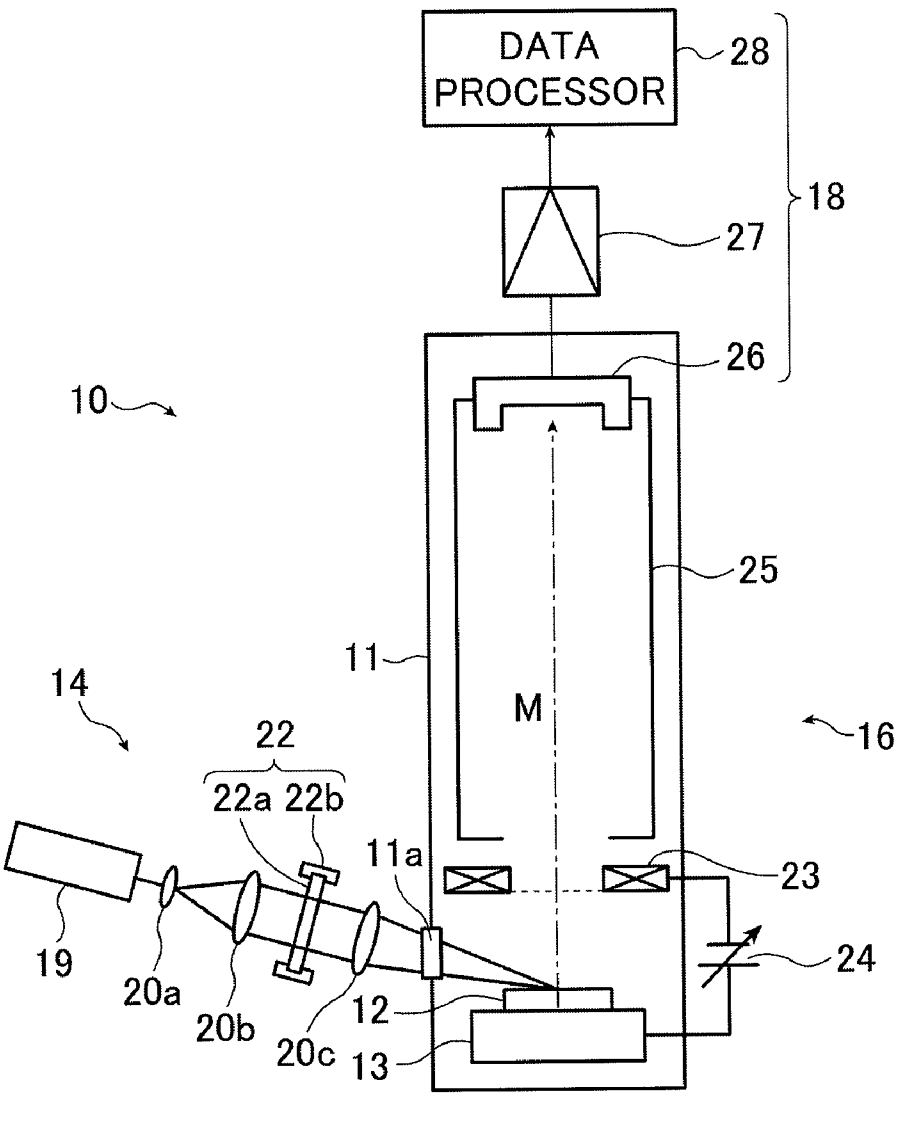
FIG. 1 is a front view illustrating a schematic configuration of an embodiment of the mass spectroscope according to the invention.

FIG. 1 is a front view illustrating a schematic configuration of an embodiment of the mass spectroscope according to the invention.

As illustrated in FIG. 1, a mass spectroscope 10 is a time-of-flight mass spectroscope (TOF-MS) whereby a substance desorbed from a mass analysis device is allowed to fly a given distance and the mass of that substance is analyzed based upon the time of the flight. The mass spectroscope 10 comprises a vacuum chamber 11, a mass analysis device (also referred to simply as "device" below) 12 disposed in the vacuum chamber 11 for attaching thereto (or placing thereon) a sample containing an analyte M, device support means 13 for supporting the device 12, light radiating means 14 for irradiating the sample attached to the device 12 with measuring light to desorb the analyte M in the sample from the device 12, flight direction control means 16 for allowing the desorbed analyte M to fly in a given direction, and mass analysis means 18 for detecting the desorbed analyte M to analyze the mass of the analyte M.

The vacuum chamber 11 is a chamber in which a vacuum can be produced and a suction pump or other like means not shown is connected to the chamber 11. A vacuum is produced in the vacuum chamber 11 by sucking air with a suction pump from the inside of the vacuum chamber 11 in a sealed state.

The vacuum chamber 11 has a window 11*a* for admitting light emitted from the light radiating means 14 into the vacuum chamber 11. The window 11*a* has a high resistance to pressure (such that it can withstand the pressure difference between the outside and the inside of the vacuum chamber 11) and is formed of a material that transmits measuring light L with a high transmittance.

The device 12 is a sheet member having metallic members permitting excitation of plasmons upon irradiation by the measuring light. The device 12 is disposed inside the vacuum chamber 11. The analyte M is placed on the surface of the device 12 where the metallic members capable of exciting plasmons are formed.

Now, the plasmon-exciting metallic members formed on one surface of the device will be described in detail below.

A microstructure 29 is provided in a region of the device 12 where the analyte M is placed. The microstructure 29 creates an enhanced electric field when it is irradiated by the measuring light.

Figure 2:
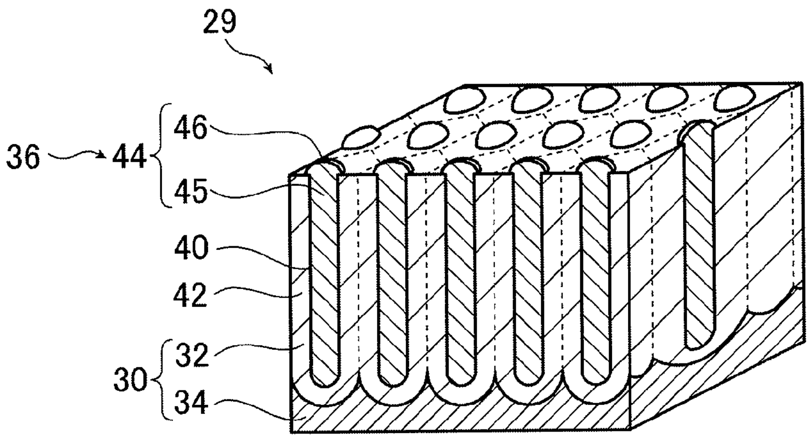
FIG. 2 is a perspective view illustrating a schematic configuration of an embodiment of a microstructure of a mass analysis device used in the mass spectroscope illustrated in FIG. 1.

FIG. 2 is a perspective view of a schematic configuration of the microstructure 29 to be placed on the surface of the device 12.

As illustrated in FIG. 2, the microstructure 29 comprises a substrate 30 and metallic members 36. The substrate 30 comprises a dielectric base 32 and an electric conductor 34 disposed on one surface of the dielectric base 32. The metallic members 36 are disposed in the surface of the dielectric base 32 opposite from the electric conductor 34.

The substrate 30 comprises the dielectric base 32 formed of a metallic oxide ($Al_2O_3$) and the electric conductor 34 disposed on one surface of the dielectric base 32 and formed of a non-anodized metal (Al). The dielectric base 32 and the electric conductor 34 are formed integrally.

The dielectric base 32 has micropores 40 each having the shape of a substantially straight tubing that extends from the surface opposite from the electric conductor 34 toward the surface closer to the electric conductor 34.

Each of the micropores 40 extends through the dielectric base 32 so as to form an opening on one end thereof in the surface opposite from the electric conductor 34, with the other end closer to the electric conductor 34 closing short of the surface of the dielectric base 32. In other words, the micropores 40 do not reach the electric conductor 34. The micropores 40 each have a diameter smaller than the wavelength of the excitation light and are arranged regularly at a pitch that is smaller than the wavelength of the excitation light.

When the excitation light used is a visible light, the micropores 40 are preferably arranged at a pitch of 200 nm or less.

The metallic members 36 are formed of rods 44 each having a filler portion 45 and a projection (bulge) 46 above each micropore. The filler portion 45 fills the inside of each micropore 40 of the dielectric base 32. The projection 46 sticks out from the surface of the dielectric base 32 and has an outer diameter greater than that of the filler portion 45. The material for forming the metallic members 36 may be selected from various metals capable of generating localized plasmons and include, for example, Au, Ag, Cu, Al, Pt, Ni, Ti, and an alloyed metal thereof. Alternatively, the metallic members 36 may contain two or more of these metals. To obtain a further enhanced field effect, the metallic members 36 are more preferably formed using Au or Ag.

The microstructure 29 has a configuration as described above such that the surface on which the projections 46 of the rods 44 of the metallic members 36 are arranged is the surface irradiated by the measuring light.

Now, the method of producing the microstructure 29 will be described.

Figure 3A:
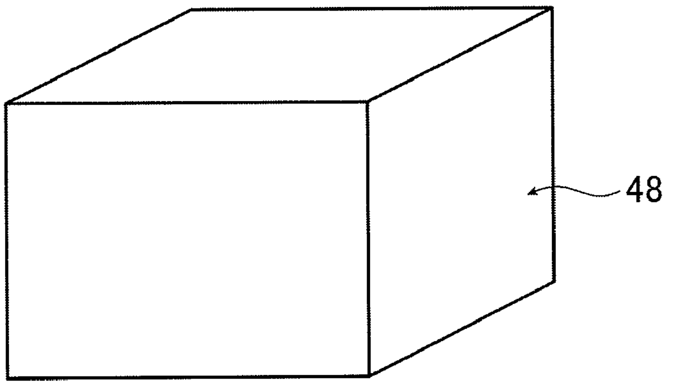
FIGS. 3A to 3C illustrate a process for producing a microstructure.
Figure 3B:
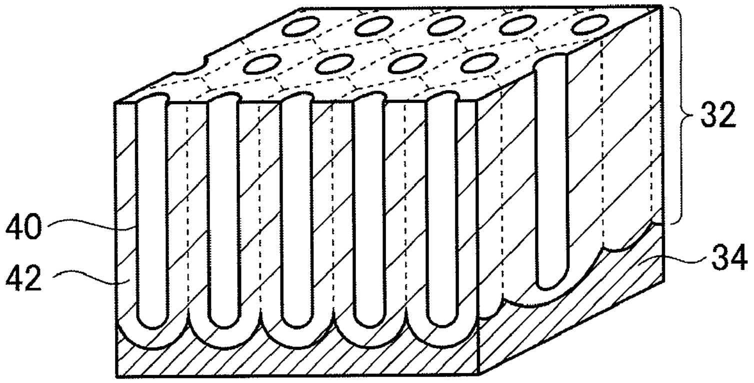
Figure 3C:
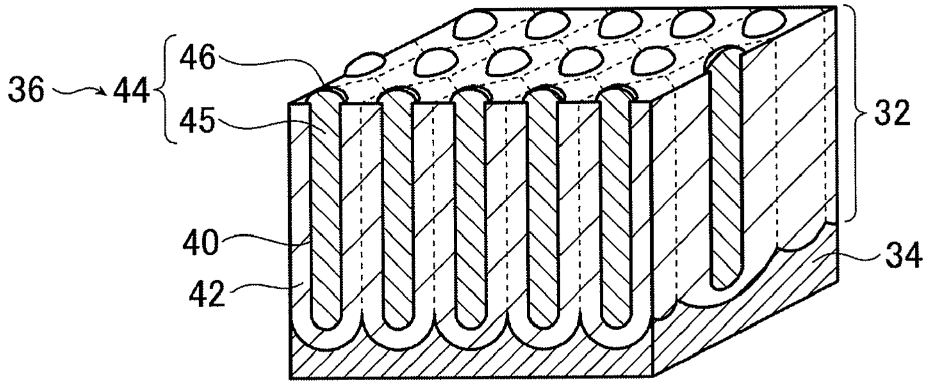

FIGS. 3A to 3C illustrate an example of the process for producing the microstructure 29.

First, a metallic body 48 to be anodized having the shape of a rectangular solid as illustrated in FIG. 3A is anodized. Specifically, the metallic body 48 to be anodized is immersed in an electrolytic solution as an anode together with a cathode, whereupon an electric voltage is applied between the anode and the cathode to achieve anodization.

The cathode may be formed, for example, of carbon or aluminum. The electrolytic solution is not limited specifically; preferably used is an acid electrolytic solution containing at least one of sulfuric acid, phosphoric acid, chromic acid, oxalic acid, sulfamic acid, benzenesulfonic acid and amidosulfonic acid.

Although the metallic body 48 to be anodized has the shape of a rectangular solid in this embodiment, the shape is not limited thereto and may vary. Further, one may use a configuration comprising a support member on which, for example, a layer of the metallic body 48 to be anodized is formed.

Anodization of the metallic body 48 causes oxidation to take place as illustrated in FIG. 3B from the surface of the metallic body 48 to be anodized in a direction substantially vertical to that surface, producing a metallic oxide ($Al_2O_3$), which is used as the dielectric base 32. The metallic oxide produced by anodization (the dielectric base 32) has a structure wherein numerous minute columns 42 each having a substantially hexagonal shape in planar view are arranged leaving no space between them.

The minute columns 42 each have a round bottom and a micropore 40 formed substantially at the center and extending straight from the top surface in the depth direction, i.e., in the direction of the axis of the minute columns 42. For the structure of a metallic oxide produced by anodization, reference may be had, for example, to "Production of Mesoporous Alumina by Anodizing Method and Applications Thereof as Functional Material" by Hideki Masuda, page 34, Zairyo Gijutsu (Material Technology), Vol. 15, No. 10, 1997.

An example of preferred anodization conditions for producing a metal oxide having a regularly arrayed structure includes an electrolytic solution having a concentration of 0.5 M, a liquid temperature in the range of 14° C. to 16° C., and an applied electric voltage of 40 V to 40 V+/−0.5 V, among other conditions, when using oxalic acid as an electrolytic solution. The micropores 40 produced under these conditions each have, for example, a diameter of about 30 nm and are arranged at a pitch of about 100 nm.

Next, the micropores 40 of the dielectric base 32 are electroplated to form the rods 44 each having the filler portion 45 and the projection 46 as illustrated in FIG. 3C.

In the electroplating, the electric conductor 34 acts as an electrode, causing a metal to be deposited preferentially from the bottoms of the micropores 40 where the electric field is stronger. Continued electroplating causes the micropores 40 to be filled with a metal, forming the filler portions 45 of the rods 44. Electroplating further continued after the formation of the filler portions 45 causes the metal to overflow from the micropores 40. However, the electric field near the micropores 40 is so strong that the metal continues to be deposited around the micropores 40 until the metal is deposited above the filler portions 45 so as to bulge from the surface of the dielectric base 32, thus forming the projections 46 having a diameter greater than that of the filler portions 45.

This is how the microstructure 29 is produced.

Referring back to FIG. 1, components of the mass spectroscope 10 will be described.

The device support means 13 supports the device 12 from the surface thereof opposite from the surface, on which the analyte M is placed, to hold the device 12 in a given position.

The light radiating means 14 comprises a laser light source 19, a diverging lens 20*a*, a collimating lens 20*b*, a converging lens 20*c*, and a polarization adjusting mechanism 22.

The laser light source 19 is a light source for emitting laser light having a given wavelength. Preferably, the laser light source 19 is a pulse laser.

The diverging lens 20*a* is a lens for diverging the laser light emitted from the laser light source 19 at a given angle and may be any of various lenses as appropriate.

The collimating lens 20*b* collimates the laser light diverged by the diverging lens 20*a*.

The converging lens 20*c* focuses the light that is collimated by the collimating lens 20*b* and passed through the polarization adjusting mechanism 22 to be described.

The polarization adjusting mechanism 22 comprises a λ/2 plate (or also called "half-wave plate") 22*a* and a polarization plate rotating unit 22*b* and is disposed between the collimating lens 20*b* and the converging lens 20*c*.

The λ/2 plate 22*a* is a polarization plate for linearly polarizing collimated light. The polarization plate rotating unit 22*b* turns the λ/2 plate 22*a* about an axis parallel to the collimated light.

The polarization adjusting mechanism 22 is capable of setting the polarization direction of the parallel light to a desired direction by turning the λ/2 plate 22*a* with the polarization plate rotating unit 20*b*.

With the light radiating means 14 thus configured, the laser light emitted from the laser light source 19 is diverged by the diverging lens 20*a*, then collimated by the collimating lens 20*b* and polarized by the λ/2 plate 22*a* of the polarization adjusting mechanism 22. The polarized light is converged by the converging lens 20*c*, then admitted into the vacuum chamber 11 through the window 11*a* as measuring light to irradiate the surface of the device 12 where the analyte M is placed. The measuring light hits the surface of the device 12 at a given angle to that surface.

The flight direction control means 16 comprises an extraction grid 23 disposed between the device support means 13 and the mass analysis means 18, a variable voltage source 24 for applying a voltage between the extraction grid 23 and the device 12, and a cover 25 for covering the flight path for the analyte M on the side of the grid 23 closer to the mass analysis means 18. The flight direction control means 16 applies a constant force to the analyte M desorbed from the device 12 to allow it to fly toward the mass analysis means 18.

The extraction grid 23 is a hollow electrode so disposed between the device 12 and the mass analysis means 18 as to face the top surface of the device 12.

The variable voltage source 24 is connected to the device support means 13 and the extraction grid 23 to apply given voltages between the device support means 13 and the extraction grid 23. Given voltages applied between the device support means 13 and the extraction grid 23 produce a given potential difference between the device 12 supported by the device supported means 13 and the extraction grid 23, thereby generating a given electric field.

The cover 25 is a hollow cylindrical member. The cover 25 is so disposed between the extraction grid 23 and the mass analysis means 18 as to enclose the flight path of the analyte M. The axis of the cylinder of the cover 25 is parallel to the flight path of the analyte M. The end of the cover 25 closer to the extraction grid 23 is located in close proximity to the extraction grid 23, and the other end thereof closer to the mass analysis means 18 is in contact with a detector 26 of the mass analysis means 18 to be described.

The flight direction control means 16 uses the variable voltage source 24 to apply an electric voltage and generate an electric field between the device 12 and the extraction grid 23, thereby applying a constant force to the analyte M desorbed from the device 12. The analyte M to which a constant force is applied by the electric field is caused to fly from the device 12 toward the extraction grid 23 at a given acceleration. The analyte M in flight passes through the cavity of the cover 25 to the mass analysis means 18.

The mass analysis means 18 comprises the detector 26 for detecting the analyte M desorbed from the surface of the device 12 upon irradiation with the measuring light and arrives at the detector 26 after flying through the extraction grid 23, an amplifier 27 for amplifying detection values given by the detector 26, and a data processor 28 for processing the output signal from the amplifier 27. The detector 26 is provided inside the vacuum chamber 11. The amplifier 27 and the data processor 28 are provided outside the vacuum chamber 11.

The detector 26 may for example be a multichannel plate (MCP).

The data processor 28 of the mass analysis means 18 detects the mass spectrum of the analyte M based upon the detection results given by the detector 26 and thereby detects the mass (mass distribution) of the analyte.

The mass spectroscope 10 basically has a configuration as described above.

Now, mass analyses accomplished using the mass spectroscope 10 will be described.

First, the analyte M is placed on the surface of the device 12, which in turn is placed on the device support means 13.

The polarization direction of the measuring light with which the surface of the device 12 is irradiated is adjusted by the polarization adjusting mechanism.

Next, given voltages are applied by the variable voltage source 24 between the device 12 and the extraction grid 23, and the measuring light is emitted from the light radiating means 14 in response to a given start signal to irradiate the device 12 with measuring light.

When the surface of the device 12 on which the analyte M is placed is irradiated by the measuring light, an enhanced field caused by plasmons is created on the surface of the device 12. The analyte M is desorbed from the measuring region by optical energy of the measuring light intensified by the enhanced field.

The analyte M, now desorbed, accelerates as it is drawn toward the extraction grid 23 by the electric field generated between the device 12 and the extraction grid 23. The analyte M then passes through the central aperture of the grid 23 and flies substantially straight through the central cavity of the cover 25 toward the detector 26. Upon arriving at the detector 26, the analyte M is detected by the detector 26.

The flight speed of the analyte M after desorption depends upon the mass thereof: the speed increases as the mass decreases so that the substance arrives at the detector 26 in the order of mass from smallest to greatest.

The output signal from the detector 26 is amplified by the amplifier 27 to a given level and then fed to the data processor 28.

The data processor 28 is fed with a synchronization signal in synchronism with the start signal mentioned earlier and calculates the time of flight of the detected substance based upon the synchronization signal and the output signal from the amplifier 27.

The data processor 28 finds the mass from the time of flight to obtain a mass spectrum. Further, the data processor 28 detects the mass of the analyte M from the mass spectrum obtained and identifies the analyte.

Where necessary, the λ/2 plate 22*a* is turned by the polarization plate rotating unit 22*b* to change the polarization direction of the measuring light, and the mass spectrum of the analyte is calculated through the same process as described above. Then the mass of the analyte is determined considering the results thus obtained, and the analyte is identified.

This is how the mass spectroscope 10 detects the mass of the analyte.

The energy generated on the device 12 (energy that aids in ionizing the analyte) can be changed by providing the polarization adjusting mechanism 22 to make the polarization direction of the measuring light adjustable and change the polarization direction of the measuring light as in the mass spectroscope 10.

For example, when the microstructure having finely arrayed projections is used as in the above embodiment, areas where plasmon enhancement is at intensified levels (hot spots) can be created on the surface of the device by arranging the polarization direction of the measuring light so as to be parallel to the surface of the substrate.

The hot spots are regions where metallic particles and projections generating localized plasmons are as close as less than several tens of nanometers to each other. In hot spots, plasmon enhancement is intensified and therefore the electric field is enhanced to an increased level. In hot spots, when the polarization direction of the measuring light is so arranged as to be parallel to the surface of the substrate, localized plasmons can be generated at projections close to each other in a preferable manner.

Thus, the energy generated on the device can be further increased by the enhanced electric field that can be intensified, permitting ionization of an analyte with a low-intensity measuring light.

When, for example, the polarization direction of the measuring light is so arranged as to be perpendicular to the surface of the substrate, a greater amount of thermal energy can be generated than energy caused by plasmons, permitting ionization of an analyte using the thermal energy as dominant energy.

As mentioned above, mere adjustment of the polarization direction allows mass analysis to be achieved with various conditions (kinds of energy such as thermal energy and energy generated by plasmons and amounts of generated energy). Thus, mass analysis that can be made with various conditions permits alteration of the kind of ions given by the analyte. Accordingly, it is made possible to detect substances that make up the analyte in different component units (i.e., in molecules divided into different units), achieving mass analysis with a higher accuracy.

Further, adjustment of the polarization direction according to the kind, shape, and the like of the device permits maximizing the excitation efficiency of the measuring light (efficiency with which the measuring light is converted into energy generated on the device 12) regardless of the kind, shape, and the like of the device.

Although the mass spectroscope 10 used the λ/2 plate as a polarization element, the invention is not limited thereto and any of various other polarization elements may be used.

Preferably, the polarization element is a Babinet Soleil plate. When a Babinet Soleil plate is used, polarization can be effected also when the wavelength of the laser light emitted from the laser light is changed.

When the polarization element used is a λ/2 plate and the laser light having a different wavelength is used, the λ/2 plate may be replaced according to the wavelength of the laser light. This, however, requires a replacement mechanism to be provided, complicating the configuration.

The polarization adjustment mechanism is not limited to the configuration where the polarization element is disposed between the collimating lens and the converging lens. The polarization direction of the measuring light may be adjusted by rotating the laser light source adapted to emit polarized light.

Figure 4:
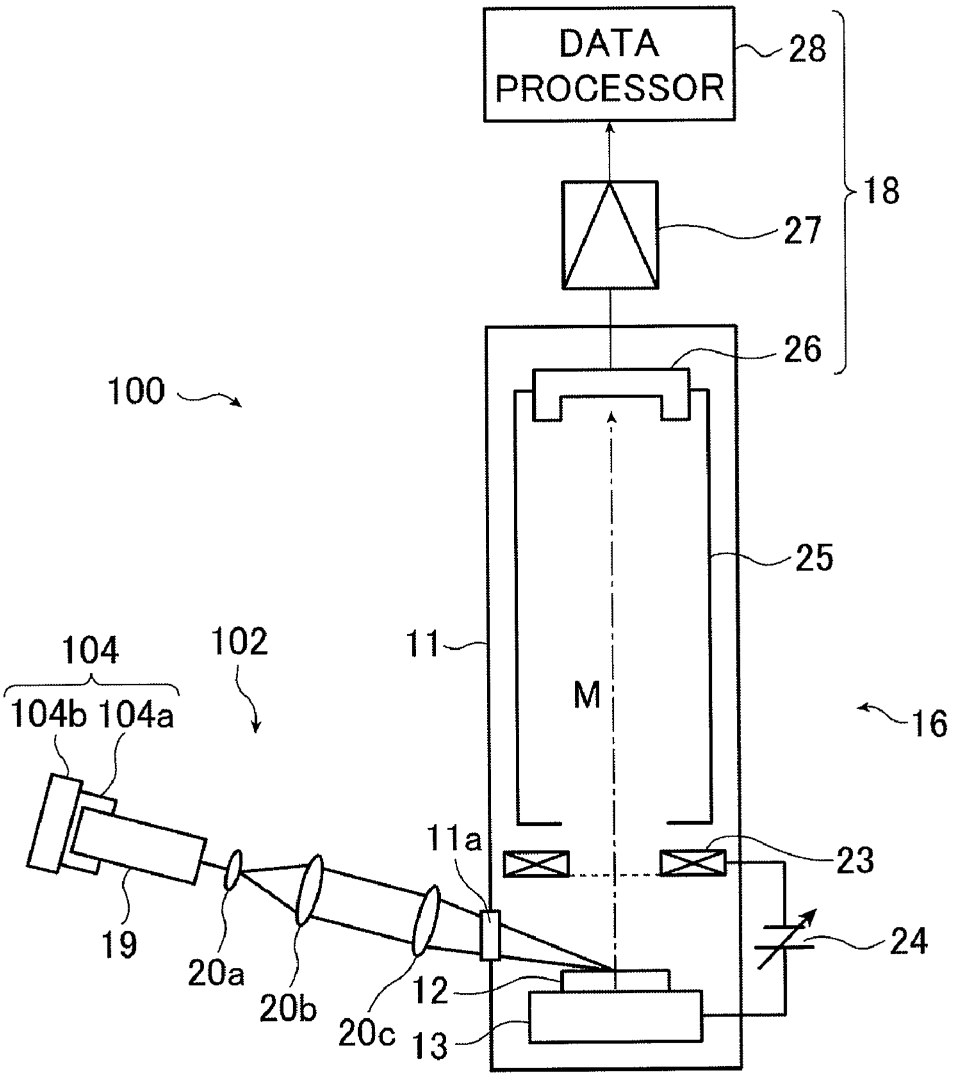
FIG. 4 is a front view illustrating a schematic configuration of another embodiment of the mass spectroscope according to the invention.

FIG. 4 is a front view illustrating a schematic configuration of another embodiment of the mass spectroscope according to the invention. A mass spectroscope 100 illustrated in FIG. 4 has the same configuration as the mass spectroscope 10 except for the configuration of a polarization adjusting mechanism 104 of a light radiating means 102. Therefore, like characters represent like components, and description thereof is omitted.

As illustrated in FIG. 4, the mass spectroscope 100 comprises the vacuum chamber 11, the device 12, the device support means 13, the light radiating means 102, the flight direction control means 16, and the mass analysis means 18.

The light radiating means 102 comprises the laser light source 19, the diverging lens 20*a*, the collimating lens 20*b*, the converging lens 20*c*, and a polarization adjusting mechanism 104. The laser light source 19, the diverging lens 20*a*, and the collimating lens 20*b*, and the converging lens 20*c* are the same as those of the light radiating means 14 illustrated in FIG. 1, and description thereof is omitted. The laser light source 19 is a light source that emits laser light polarized in a given direction.

The polarization adjusting mechanism 104 comprises a light source support 104*a* and a light source rotating unit 104*b*. The light source support 104*a* supports the laser light source 19 from the side thereof opposite from the side from which the laser light source 19 emits light.

The light source rotating unit 104*b* is rotatably connected with the light source support 104*a* to turn the light source support 104*a*, thereby turning the laser light source 19 about the optical axis of the laser light emitted from the laser light source 19.

Thus, the polarization direction of the laser light emitted from the laser light source 19 can be changed and, hence, the polarization direction of the measuring light that irradiates the device 12 can be changed also by turning the laser light source 19 with the polarization adjusting mechanism 104.

Thus, the mass spectroscope 100 also is capable of adjusting the polarization direction of the measuring light that irradiates the device 12 and producing the same effects as does the mass spectroscope 10 described above.

Preferably, the polarization adjusting mechanisms 22 and 104 of the mass spectroscopes 10 and 100, respectively, are both remotely operated to adjust the polarization direction.

Specifically, the polarization plate rotating unit 22*b* of the polarization adjusting mechanism 22 is preferably operated remotely to turn the λ/2 plate; the light source rotating unit 104*b* of the polarization adjusting mechanism 104 is preferably operated remotely to turn the laser light source 19.

Thus, the remotely operated adjustment of the polarization direction permits adjustment of the polarization direction without touching the inside of the system.

Although the measuring light hits or irradiates the device 12 at a given angle in both the mass spectroscope 10 and the mass spectroscope 100, the invention is not limited this way. The light radiating means may be adapted so that the measuring light hits the device 12 at right angles to the device 12.

When the measuring light is thus adapted to hit the device 12 at right angles, adjusting the polarization that is parallel to the surface of the device using a polarization control mechanism allows mass analyses to be performed with various conditions.

When the measuring light is adapted to hit the device 12 at right angles, the analyte desorbed from the device can be caused to fly in directions other than in the upright direction by positioning the extraction grid so that it is inclined a given angle with respect to the surface of the device.

Preferably, the device 12 is surface-modified (provided with trapping members) so that it can trap the analyte and allows the analyte to desorb from the surface of the device upon irradiation by the measuring light in both the mass spectroscope 10 and the mass spectroscope 100.

When the analyte is an antigen, for example, the amount of the analyte attached to the surface of the microstructure can be increased and the sensitivity with which the mass analysis measurement is made can be improved by modifying the surface of the microstructure with an antibody that is capable of binding specifically to the antigen.

Figure 5A:
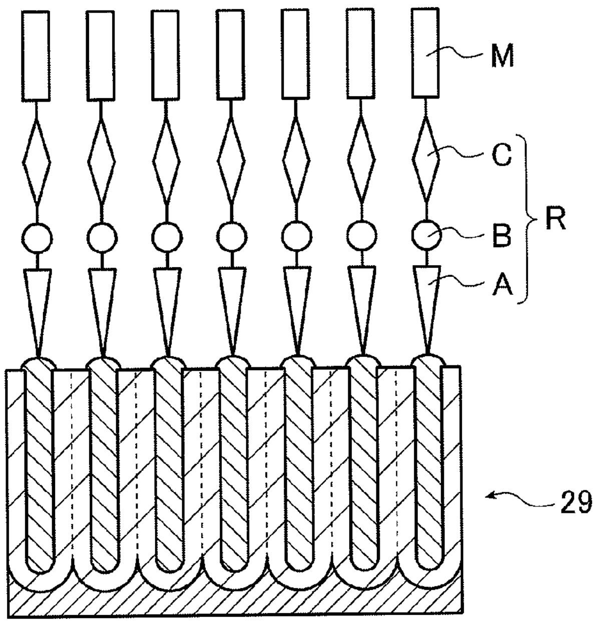
FIG. 5A is a sectional view illustrating a schematic configuration of a surface modified microstructure.
Figure 5B:
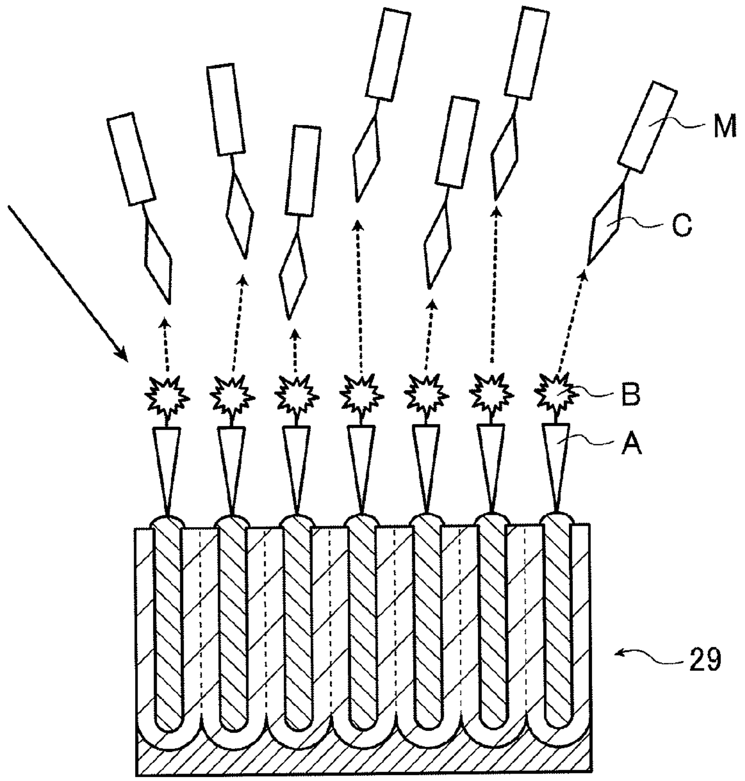
FIG. 5B is a sectional view illustrating a state where an analyte is desorbed from the microstructure illustrated in FIG. 5A.

FIG. 5A is a sectional view illustrating a schematic configuration of a surface-modified microstructure; FIG. 5B is a sectional view illustrating a state where an analyte is desorbed from the microstructure illustrated in FIG. 5A. FIGS. 5A and 5B illustrate a surface modification R and its components on an enlarged scale for easy recognition.

On the surface of a microstructure 29, the surface modification R comprises first linker function units A that bind to the surface of the microstructure 29, second linker function units C that bind to the analyte M, and decomposing function units B that are disposed between the first linker function units A and the second function units C and decomposed by electric fields generated by the irradiation by the measuring light, as illustrated in FIG. 5A. In the illustrated example, the analyte M is disposed close to the measuring region of the mass analysis device through the intermediary of the surface modification R.

The surface modification R may be a single substance comprising all of the first linker function units A, the second linker function units C, and the decomposing function units B. Alternatively, these units may be different substances. Alternatively, the first linker function units A and the decomposing function units B may be one substance or the decomposing function units B and the second linker function units C may be one substance.

When the device 12 is irradiated by the measuring light, localized plasmons are generated on the surface of the microstructure to create enhanced fields on the surface in the measuring region. The optical energy of the measuring light is enhanced near the surface by the enhanced fields generated at the surface in the measuring region.

As illustrated in FIG. 5B, the enhanced energy causes the decomposition of the decomposing function units B of the surface modification, desorbing the analyte M and the second linker function units C bound to the analyte M from the surface in the measuring region.

Thus, the analyte can be desorbed from the surface of the microstructure by using the surface modification.

Further, because the analyte M is bound to the microstructure 29 through the intermediary of the surface modification, the analyte M can be located apart from the surface of the microstructure in the measuring region.

The enhanced field effect produced at the surface of the microstructure is caused by near-field light that is in turn produced by localized plasmons and, hence, decreases exponentially with respect to the distance from the surface. Accordingly, with the analyte M positioned relatively away from the surface as illustrated in FIG. 5A, the field enhancement has a minimized effect upon the optical energy of the measuring light with which the analyte M is irradiated. Thus, the damage to the analyte M caused by the intensified optical energy can be reduced so that a high-accuracy mass analysis can be achieved.

The configuration of the microstructure is not limited to that of the microstructure 29 and may vary, provided that it comprises projections having dimensions permitting excitation of localized plasmons on the substrate.

Figure 6A:
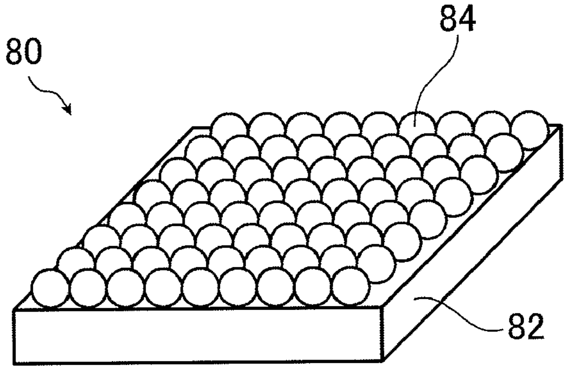
FIG. 6A is a perspective view illustrating a schematic configuration of another example of microstructure.
Figure 6B:
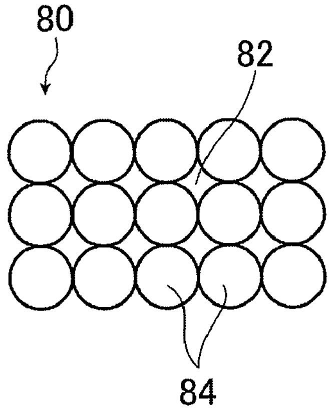
FIG. 6B is a partial top plan view of FIG. 6A.

FIG. 6A is a perspective view illustrating a schematic configuration of another example of the microstructure; FIG. 6B is a top plan view of FIG. 6A.

A microstructure 80 illustrated in FIGS. 6A and 6B comprises a substrate 82 and numerous metallic particles 84 disposed on the substrate 82.

The substrate 82 is a base material in the form of a plate. The substrate 82 may be formed of a material capable of supporting the metallic particles 84 in an electrically insulated state. The material thereof is exemplified by silicon, glass, yttrium-stabilized zirconia (YSZ), sapphire, and silicon carbide.

The numerous metallic particles 84 are each of dimensions permitting excitation of localized plasmons and held in position so that they are spread on one surface of the substrate 82.

The metallic particles 84 may be formed of any of the metals cited above for the metallic members 36. The shape of the metallic particles is not limited specifically; it may be, for example, a sphere or a rectangular solid.

The microstructure 80 having such a configuration can also generate localized plasmons around the metallic particles and, hence, an enhanced electric field when the detection surface on which the metallic particles are disposed is irradiated by the excitation light.

Figure 7:
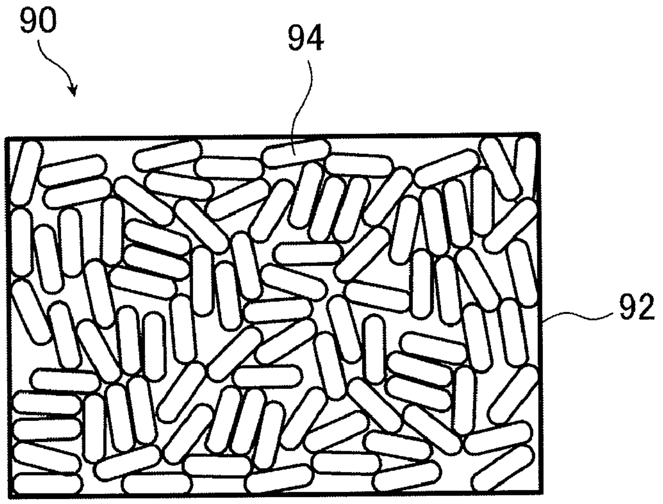
FIG. 7 is a top plan view illustrating a schematic configuration of another example of microstructure.

FIG. 7 is a top plan view illustrating a schematic configuration of another example of the microstructure.

A microstructure 90 illustrated in FIG. 7 comprises a substrate 92 and numerous metallic nanorods 94 disposed on the substrate 92.

The substrate 92 has substantially the same configuration as the substrate 82 described earlier, and therefore a detailed description thereof is not given here.

The metallic nanorods 94 are metallic nanoparticles each having dimensions permitting excitation of localized plasmons and each shaped like a rod having the minor axis and the major axis different in length from each other. The metallic nanorods 94 are secured so that they are fixedly disposed on one surface of the substrate 92. The minor axis of the metallic nanorods 94 measures about 3 nm to 50 nm, and the major axis measures about 25 nm to 1000 nm. The major axis is smaller than the wavelength of the excitation light. The metallic nanorods 94 may be formed of the same metal as the metallic particles described above. For details of the configuration of metallic nanorods, reference may be had, for example, to JP 2007-139612 A.

The microstructure 90 may be produced by the same method as described above for the microstructure 80.

The microstructure 90 having such a configuration can also create an enhanced electric field when the detection surface on which the metallic nanorods are disposed are irradiated by the excitation light.

Figure 8A:
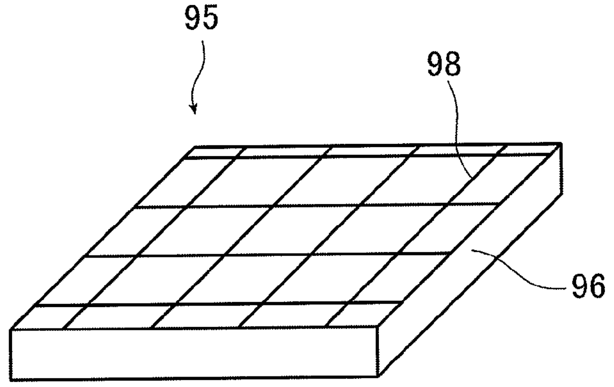
FIG. 8A is a perspective view illustrating a schematic configuration of another example of microstructure.
Figure 8B:
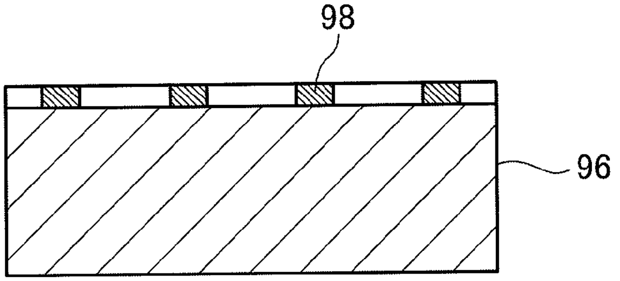
FIG. 8B is a sectional view of FIG. 8A.

Now, reference is made to FIG. 8A, which is a perspective view illustrating a schematic configuration of another example of the microstructure; FIG. 8B is a sectional view of FIG. 8A.

A microstructure 95 illustrated in FIG. 8 comprises a substrate 96 and numerous thin metallic wires 98 provided on the substrate 96.

The substrate 96 has substantially the same configuration as the substrate 82 described earlier, and therefore detailed description thereof is not given here.

The thin metallic wires 98 are linear members each having a line width permitting excitation of localized plasmons and arranged like a grid on one surface of the substrate 96. The thin metallic wires 98 may be formed of the same metal as the metallic particles and the metallic members described earlier. The thin metallic wires 98 may be produced by any of various methods used to produce metallic wiring including but not limited to vapor deposition and plating.

The line width of the thin metallic wires 98 is preferably not greater than a mean free path of electrons that oscillate in metal in response to light, say 50 nm or less, and preferably 30 nm or less. The thin metallic wires 98 may be arranged in any pattern including but not limited to a pattern where the thin metal wires do not cross each other, i.e., are parallel to each other. The thin metallic wires 98 are also not limited in shape to straight lines and may be curved lines.

Thus, an enhanced electric field can be generated by localized plasmons also in the microstructure 95 having such a configuration when the detection surface on which the thin metallic wires are arranged is irradiated by the excitation light.

Further, the microstructure is not limited to the microstructure 29, the microstructure 80, the microstructure 90, or the microstructure 95; the microstructure may have a configuration comprising projections from these microstructures capable of exciting localized plasmons.

Note that the embodiments of the mass spectroscope of the invention described above in detail are only illustrative and not restrictive of the invention and that various improvements and modifications may be made without departing from the spirit of the invention.

What is claimed is:

1. A mass spectroscope comprising:

a mass analysis device including a surface having metallic members capable of exciting plasmons when irradiated by laser light, the mass analysis device allowing an analyte to be attached to the surface;

light radiating means for irradiating the surface of the mass analysis device with laser light to generate an energy thereon to ionize the analyte attached to the surface and desorb the analyte from the surface a polarization plate disposed on an optical axis of the laser light from the light radiating means;

a polarization plate rotating unit that rotates the polarization plate about the optical axis of the laser light to change a polarization direction of the laser light so that the energy generated on the surface of the mass analysis device by the laser light is changed; and detecting means for calculating a plurality of mass spectrums of the analyte ionized and desorbed from the surface of the mass analysis device from of flight of the analyte for laser lights of different polarization directions due to a rotation of the polarization plate by the polarization plate rotating unit and detecting a mass of the analyte based on the calculated mass spectrums of the analyte.

2. The mass spectroscope according to claim 1, wherein the light radiating means is so adapted that the laser light hits the surface of the mass analysis device at a given angle to the surface.

3. The mass spectroscope according to claim 1, wherein the light radiating means is so adapted that the laser light hits the surface of the mass analysis device at right angles to the surface.

4. The mass spectroscope according to claim 1, wherein the polarization plate comprises a λ/2 plate.

5. The mass spectroscope according to claim 1, wherein the polarization plate comprises a Babinet-Soleil plate.

6. The mass spectroscope according to claim 1, further comprising an operation unit for remotely operating the polarization plate rotating unit.

* * * * *